3,562,160
LUBRICATING OIL COMPOSITION
John Frederick Ford, Camberley, Surrey, and John Michael Woodl, Ashford, Middlesex, England, assignors to The British Petroleum Company Limited, London, England, a corporation of England
No Drawing. Original application Mar. 24, 1965, Ser. No. 442,522. Divided and this application Dec. 19, 1967, Ser. No. 708,743
Int. Cl. C10m 1/32, 1/44
U.S. Cl. 252—49.9                                1 Claim

ABSTRACT OF THE DISCLOSURE

Lubricating compositions are provided comprising a lubricating base oil and a phosphorus- and nitrogen-containing polymeric additive, the polymeric additive being prepared by a combined phosphorylation/polymerisation reaction of an alphaolefin having up to twenty carbon atoms with a phosphorus halide in the presence of a Friedel-Crafts polymerisation catalyst, the molar ratio of olefin to phosphorus halide being 100:0.1–25, and the Friedel-Crafts polymerisation catalyst being present in at least a 1.5:1 molar excess over the phosphorus halide to obtain a phospho-halogenated polymer which is, thereafter, reacted with an amine.

---

This application is a division of our co-pending application, Ser. No. 442,522, filed Mar. 24, 1965, and now abandoned.

This invention relates to the preparation of phosphorus- and nitrogen-containing olefin polymers suitable for use as additives for improving the viscosity index and detergent/dispersant properties of lubricating oils, and to lubricating compositions containing such polymers.

According to the invention, a liquid phosphorus- and nitrogen-containing olefin polymer is prepared by reacting an olefin, preferably an alpha olefin having up to 20 carbon atoms, with a phosphorus halide, preferably chloride or bromide, the molar ratio of olefin to phosphorus halide being 100:0.1–25, preferably 100:2–10, in the presence of at least 1.5 moles of a Friedel-Crafts catalyst per mole of phosphorus halide and at a temperature below 60° C. so as to produce a phospho-halogenated polymer, removing the catalyst from the phospho-halogenated polymer and reacting the latter with an amine, preferably a linear polyamine, and preferably at a temperature within the range 50°–100° C. so as to produce a phosphoramidate of the polymer.

Removal of the catalyst from the phospho-halogenated polymer is most easily effected by washing with water. However, the water may cause hydrolysis of the polymer, i.e., conversion of the halogen groups therein to hydroxyl or oxygen groups and where such hydrolysis occurs it is necessary to rehalogenate the polymer before reacting it with the amine and this is most conveniently done by reacting it with a chlorinating agent such as a sulphur halide or oxyhalide or a phosphorus halide or oxyhalide, for example thionyl chloride or phosphorus pentachloride. This halogenation reaction may suitably be carried out at a temperature within the range 40–80° C.

Patricularly suitable amines are tetraethylenepentamine, triethylenetetramine and diethylenetriamine.

Preferably the molar ratio of Friedel-Crafts catalyst to phosphorus halide is 1.5–2.5:1. Suitable Friedel-Crafts catalysts include aluminum chloride, zinc chloride, antimony chloride, ferric chloride, stannic chloride, titanium chloride, boron trifluoride and hydrogen fluoride. Particularly preferred is a mixture of aluminum halide and one or more weaker Friedel-Crafts olefin polymerisation catalysts e.g. $ZnCl_2$, $SbCl_3$, $FeCl_3$, $SnCl_4$, and $TiCl_4$. An especially preferred catalyst is a mixture of $AlCl_3$ and $TiCl_4$.

In order to produce products that are liquid at normal ambient temperatures, it will be necessary in most cases to carry out the phosphorylation/polymerisation reaction at a temperature $-60°$ C.

Suitable alpha olefins are the methyl-substituted butenes, pentenes and hexenes. 4-Methylpentene-1 is particularly preferred.

The phosphorylation/polymerisation reaction is preferably carried out in an inert solvent such as a chlorinated hydrocarbon e.g. methylene chloride, ethyl chloride, ethyl bromide or carbon tetrachloride.

The rehalogenation reaction and the reaction of the polymer with the amine are preferably carried out in an inert solvent in which both the chlorinating agent and the phosphopolymer are readily soluble. Suitable solvents are methylene chloride, carbon tetrachloride, trichloroethylene, chloroform, benzene and toluene. High boiling solvents are preferred. The polymer and chlorinating agent may be heated together for 1–3 hours at 40°–80° C. Preferably 1–3 moles of chlorinating agent are used per atom of phosphorus in the polymer. Following the removal, e.g. by distillation, of unreacted chlorinating agent, the product may be added slowly to a solution of the amine (e.g. 1–3 moles per atom of P) at 50°–100° C.

The invention also includes phosphorus- and nitrogen-containing olefin polymers prepared as described above.

The invention further includes lubricating compositions consisting essentially of a major proportion of a lubricating base oil (which may be mineral or synthetic) and a minor proportion, e.g. 0.1 to 25%, especially 1–10%, by weight of the composition, of a phosphorus- and nitrogen-containing olefin polymer, as specified above.

An example of the preparation of a phosphorus- and nitrogen-containing polymer according to the invention (Polymer P) will now be described.

(PREPARATION OF POLYMER P)

$AlCl_3$ (0.025 molar parts, 3.379 g.), $TiCl_4$ (0.025 molar parts, 2.79 cc.) and $PCl_3$ (0.025 molar part, 2.21 cc.) were dissolved in ethyl bromide (150 cc.). The solution was cooled under a nitrogen atmosphere to 0° C. and 4-methylpentene-1 (0.5 molar part, 42.6 g.) added slowly with stirring. Polymerisation occurred after about 25 percent of the olefin had been added, the reaction being maintained at 0° C. by cooling. The polymerisation was only slightly exothermic and no polymer was precipitated from the solution. When all the olefin had been added and reaction had ceased, heptane (150 cc.) was added and then water (100 cc.). The ethyl bromide was removed by distillation and replaced by an equal volume of heptane. The heptane solution was washed with water until the washings were no longer acidic to insure complete removal of the catalysts and the layers were separated by centrifuging. Evaporation of the heptane yielded 43 g. of a pale yellow polymer having a phosphorus content of 1.4 percent weight.

6 g. of this polymer (hereinafter called Polymer A) were dissolved in toluene (120 cc.). Thionyl chloride (0.65 g.) was added and the solution stirred at 70° C. under a nitrogen atmosphere for 3 hours. The volume of the solution was then slowly reduced to 40 cc. by distillation under reduced pressure. The solution was cooled and added slowly to a stirred solution of tetraethylenepentamine (1.54 g.) in toluene (10 cc.) maintained at 90° C. When addition was complete, insoluble solids and oil were removed by centrifuging, mineral oil (6 g.) added and the toluene removed under reduced pressure. Excess TEPA was removed by heating to 150° C., 0.5 mm. Hg.

The product (12 g.) was a pale yellow liquid having a nitrogen content of 1.7% wt. (Polymer P).

The dispersant/detergent properties of Polymer A were determined by a carbon sedimentation test which measures the ability of the compound being tested to retard the settling of a suspension of carbon black in n-heptane. In this test 0.05 g. of the material to be tested are weighed in a test-tube 6" x ½" and 10 ml. n-heptane added; the material is dissolved by heating if necessary. 0.1 g. American Carbon Black "Kosmos BB" is added to the solution which is shaken vigorously and allowed to stand overnight. The next day the test-tube is inverted 10 times and the rate at which the carbon black falls to the bottom of the test-tube assesses the dispersant properties of the material. Comparative assessments are done by measuring the time taken for the carbon black layer to fall below 1.2 cm. in height. The height of the solution at the beginning is 7.5 cm.

Comparative results of the test are given in the table below on Polymer P, Polymer A, a straight 4-methylpentene-1 polymer prepared with an $AlCl_3$ catalyst —50° C., and polymers MW7(a) and MW7(b) which are described in U.S. Pat. No. 3,397,219, granted Aug. 13, 1968 and which were prepared similarly to polymer A but using $AlCl_3$ only as the catalyst.

TABLE

| Additive: | Carbon sedimentation time |
|---|---|
| None | 1 minute. |
| Poly 4-methylpentene-1 | 10 minutes. |
| MW7(a) | 8 hours, 50 minutes. |
| MW7(b) | 5 hours. |
| Polymer A | 30–35 hours. |
| Polymer P | 130 hours. |

The outstanding detergent/dispersant properties of the polymer according to the present invention are clearly shown.

We claim:
1. A lubricating composition consisting essentially of a mineral or synthetic lubricating base oil having incorporated therein a liquid phosphorus- and nitrogen-containing polymer in an amount of from 0.1% to 25% by weight of the composition, said polymer prepared by reacting an alpha alkenyl olefin having up to 20 carbon atoms with a phosphorus trihalide selected from the group consisting of phosphorus trichloride and phosphorus tribromide, in the presence of 1.5 to 2.5 moles of a Friedel-Crafts catalyst per mole of said phosphorus trihalide, in the presence of an inert organic solvent and at a temperature in the range about —60° C. to about 60° C. so as to produce a phospho-halogenated polymer, the molar ratio of said alpha alkenyl olefin to said phosphorus trihalide being 100:0.1–25, and said Friedel-Crafts catalyst being selected from the group consisting of aluminium chloride, zinc chloride, antimony chloride, ferric chloride, stannic chloride, titanium chloride, a mixture of aluminium trichloride and titanium tetrachloride, and boron trifluoride, separating the said formed phospho-halogenated polymer from said Friedel-Crafts catalyst and recovering said formed polymer, and thereafter reacting said formed phospho-halogenated polymer in the presence of an inert organic solvent with a linear aliphatic polyamine selected from the group consisting of tetraethylenepentamine, triethylenetetramine and diethylenetriamine at a temperature in the range of about 50–100° C. thereby forming a phosphoramidate of said polymer, and recovering the phosphoramidate of the polymer.

References Cited

UNITED STATES PATENTS

| 2,316,084 | 4/1943 | Loane et al. | 252—32.5X |
| 3,259,654 | 7/1966 | Le Suer | 252—49.9X |

DANIEL WYMAN, Primary Examiner

W. J. SHINE, Assistant Examiner

U.S. Cl. X.R.

252—32.5

PO-1050
(5/69)

UNITED STATES PATENT OFFICE
CERTIFICATE OF CORRECTION

Patent No. 3,562,160           Dated February 9, 1971

Inventor(s) John Frederick Ford and John Michael Wood

It is certified that error appears in the above-identified patent and that said Letters Patent are hereby corrected as shown below:

Column 1, line 3 - change "Wood1" to - - Wood - -

Column 2, line 7, after the word "temperature" insert

- - above - -

Signed and sealed this 18th day of May 1971.

(SEAL)
Attest:

EDWARD M. FLETCHER, JR.
Attesting Officer

WILLIAM E. SCHUYLER, JR.
Commissioner of Patents